United States Patent [19]

Geldmacher

[11] 4,184,591
[45] Jan. 22, 1980

[54] METHOD FOR PRODUCING CIGARETTE PACKAGES AND PACKAGES PRODUCED BY THIS METHOD

[76] Inventor: Erwin H. Geldmacher, Tannenwaldallen 25, 638 Bad Homburg, Fed. Rep. of Germany

[21] Appl. No.: 889,742

[22] Filed: Mar. 24, 1978

Related U.S. Application Data

[60] Continuation of Ser. No. 554,426, Mar. 3, 1975, abandoned, which is a continuation of Ser. No. 280,449, Aug. 14, 1972, abandoned, which is a division of Ser. No. 35,116, May 6, 1970, Pat. No. 3,732,663.

[30] Foreign Application Priority Data

| May 8, 1969 [DE] | Fed. Rep. of Germany | 1923588 |
| Aug. 7, 1969 [DE] | Fed. Rep. of Germany | 1940302 |
| Aug. 7, 1969 [DE] | Fed. Rep. of Germany | 1940312 |
| Aug. 7, 1969 [DE] | Fed. Rep. of Germany | 1940313 |

[51] Int. Cl.² .............................................. B65D 85/10
[52] U.S. Cl. .................................. 206/265; 206/268; 206/443
[58] Field of Search ............... 206/265, 258, 264, 419, 206/470, 616, 617, 268, 443

[56] References Cited

U.S. PATENT DOCUMENTS

| 1,870,299 | 8/1932 | Sterelitz | 206/258 |
| 2,158,971 | 5/1939 | Stratton | 206/258 |
| 3,121,492 | 2/1964 | De Paul et al. | 206/264 |
| 3,246,745 | 4/1966 | Stoker, Jr. | 206/419 |
| 3,371,775 | 3/1968 | Butler | 206/258 |
| 3,437,199 | 4/1969 | Jacobson | 206/470 |

*Primary Examiner*—William T. Dixson, Jr.
*Attorney, Agent, or Firm*—Irving M. Weiner; Pamela S. Austin; Melvin Yedlin

[57] ABSTRACT

The specification describes a method for the production of cigarette packages in which a first foil web of thermoplastic material, supplied from the supply roll, and having a width exceeding the length of the cigarettes to be packed, is pressed into troughs corresponding to the size of the cigarettes to be packed, cigarettes are placed in the troughs, a second flat web of foil supplied from a second supply roll is placed over the cigarettes to cover them and the webs are connected together. Following this the two webs are separated to form sections which constitute substantially complete packages. The shaping of the troughs accepting the cigarettes individually occurs in the one first foil web on a drum provided with molds which can be placed under suction.

10 Claims, 17 Drawing Figures

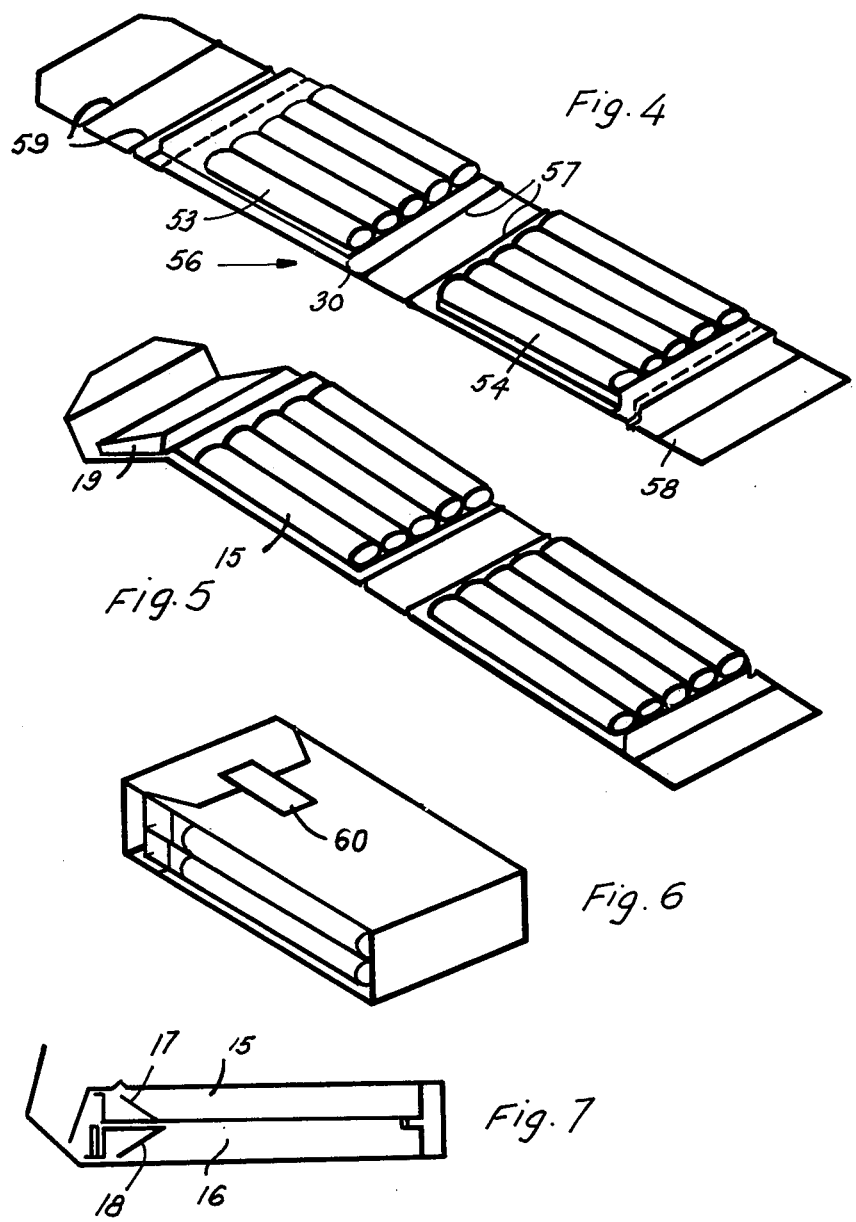

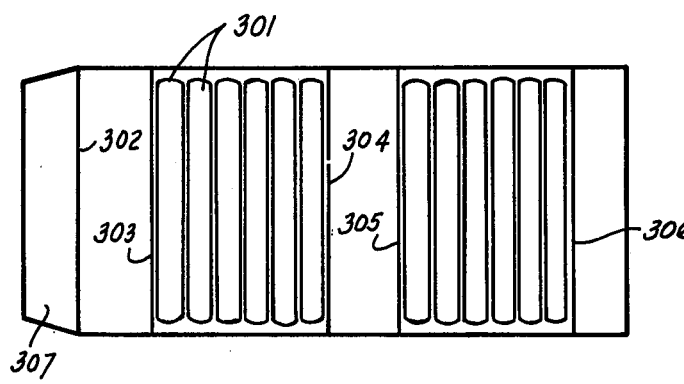
Fig. 13
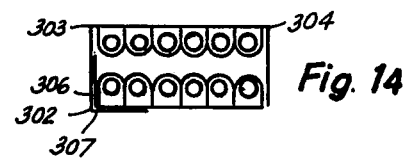
Fig. 14
Fig. 16
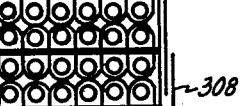
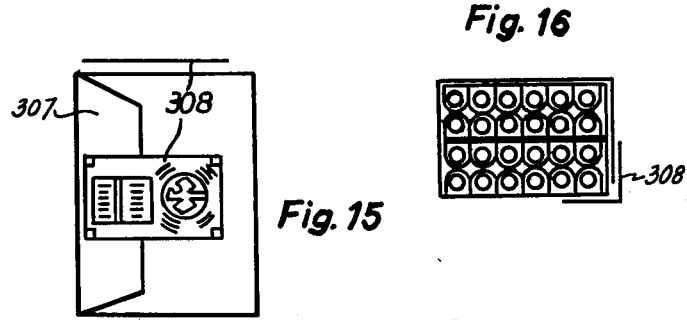
Fig. 15
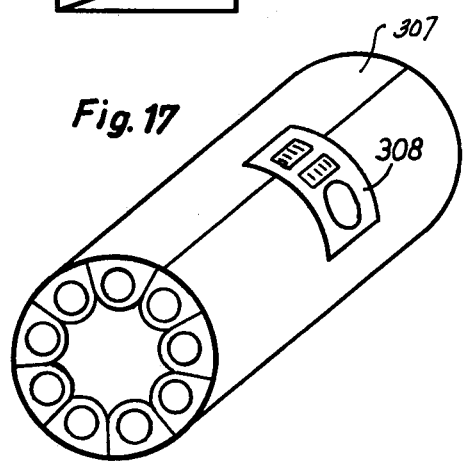
Fig. 17

METHOD FOR PRODUCING CIGARETTE PACKAGES AND PACKAGES PRODUCED BY THIS METHOD

This is a continuation of application Ser. No. 554,426, filed Mar. 3, 1975, now abandoned, which in turn is a continuation of Application Ser. No. 280,449 filed Aug. 14, 1972 now abandoned, which in turn is a division of Application Ser. No. 35,116 filed May 6, 1970 which issued as U.S. Pat. No. 3,732,663 on May 15, 1973.

The present invention relates to methods for the production of cigarette packages. More particularly the invention relates such methods in which a first foil web of thermoplastic material, supplied from the supply roll, and having a width exceeding the length of the cigarette to be packed, is pressed into troughs corresponding to the size of the cigarette to be packed. Cigarettes are placed in the troughs. A second flat web of foils supplied from a second supply roll is placed over the cigarette to cover them and the webs are connected together, following which the two webs are separated in form sections which constitute substantially complete packages, that is to say packages only requiring a few simple operations to finish them.

One object of the present invention is to improve this method, one form of which is for instance described in the Belgian specification No. 718,876, so that production of the packages occurs more rapidly.

A further object of the invention is to produce packages by the method which are free of loose tobacco crumbs as particles detached from the cigarettes.

A still further object of the invention is to produce packages which are, as nearly as possible, of the same shape as conventional cigarette packages without the advantages of individual packaging of the cigarettes in troughs being lost.

With a view to achieving this aim the method in accordance with the invention is characterized in that the shaping of the troughs for accommodating the individual cigarettes in the first foil web, the so-called trough web, occurs on a drum provided with trough molds which can be placed under vacuum. After formation of the troughs the foil web passes to a filling roller provided with suitable trough-receiving recesses, the filling roller possibly being constituted by a part of the drum, and in which the filling of an individual trough occurs and in cooperation with which the second covering foil web is laid over the filled trough. The second foil web is welded to the first web containing the troughs, following which this twin web construction passes to cutting and scribing devices which separate substantially finished packages from it which then only need to be folded together and form a final complete package.

During the course of these operations it is possible, as a departure from the previously known method, simultaneously with the welding operation to provide an opening or tear open strip on the inside of welding seams constituting the connection between the foils extending along the longitudinal edge and/or transverse edges, and the first foil is slit in the direction of travel before reaching the filling roller.

Preferably in accordance with a further embodiment of the invention a foil band is introduced broadly covering the slit on both sides. It is especially advantageous to displace one of the foil parts separated by the slit in a direction perpendicular to the direction of travel before running on the drum so that at the position of separation the two foil parts are caused to overlap. This makes it possible to properly reclose the finished package after the package has once been opened by tearing open the covering first foil web with the opening strip contained in it.

Instead of a separation of the first foil web to be provided with troughs in the direction of travel it is possible, naturally, to introduce an additional foil, which is preferably narrower, forming an addition to a main foil which will be lid of the package.

Finally in accordance with a further development of the present invention a part of the package adjacent to the position of opening is not provided with grooves or troughs for the individual cigarettes but is in the form of a pocket with a flat bottom and having the depth of the troughs and extending over any desired number of cigarettes, so that undesired displacement of the package is prevented and closing after once opening for removal of cigarettes is facilitated.

Furthermore it is advantageous to provide, after each group of packed cigarettes a cut in the first foil extending as far as the level of a slit and also engaging the second foil and a counter foil to make possible only an engagement of one group of cigarettes after tearing open the packing, if it should be desired to arrange several individual packages in a larger package.

It is particularly convenient if the slit to be produced is not perpendicular to the foil web but is made oblique in relation to it such that a flap is produced with a front edge extending obliquely downwardly and which after opening and releasing springs back practically automatically on placing the package upright again, into the closing position.

Other possibilities for producing a cap consist, in accordance with a further development of the invention, of applying to the first foil on running into the apparatus upstream from the embossing roller in the direction of travel a chemical in the form of a line, applied by means of a pin or brush. The chemical attacks the thermoplastic material, more particularly during the thermoplastic shaping, along the line drawn to such an extent that the plastic material can easily be broken open along this line.

Naturally it is also possible to cover the line of weakness by a covering foil. It is also possible in this respect to carry out the weakening to such an extent that the plastic along this line is already broken open.

It is also advantageous only to draw the lines of weakness over one or a few cigarettes in the package so that it has interruptions along it. In this respect there is the possibility of forming the package in such a manner that only one or a few cigarettes are made available at a time, while the other cigarettes remain enclosed until the corresponding part of the cigarette package is opened. This presents a complete departure from known packages which upon opening expose all cigarettes and the cigarettes are exposed to the atmosphere.

Basically the principle of the invention also makes possible an acclimatisation of the individual parts of the package or their treatment with a gas so that owing to the possibility of a division of the package into several compartments, each cigarette remains in its own atmosphere in its unopened compartmnt in the package until it is removed for use.

An apparatus for carrying out the method in accordance with the invention can comprise basically a frame with a driven drum mounted on it and having recesses for the formation of the troughs, a heating device extending over the range of contact with the foil on the drum and at least one suction device extending over at least one range of the drum, a filling roller arranged to receive the first foil web from the drum or forming a part of it, a supply device for supplying individual cigarettes, and, downstream from the position at which the cigarettes are supplied, a contact or supply roller for the second or covering foil web, a cutting and scribing device for the closed combination formed by the trough and covering foil, this being followed by a fold producing means.

Naturally it is advantageous to provide immediately following the device carriers for the foil supply roll supplying the first foil web to be provided with troughs and also carriers for the foil web roll supplying the second foil web, together with suitable web roll changing devices.

The introduction of the cigarettes into the first foil can occur directly from a conventional cigarette hopper.

It is however, also advantageous to provide at least one shaking station, with an associated suction device and a steam-applying station for the treatment of the cigarettes supported on a conveyor and moving towards the first foil web.

It of course follows that in the case of cigarettes without filters such steam-applying means will be provided for treating both ends of the cigarettes, while in the case of filter cigarettes only one such steam-applying device is provided for treating the end of the cigarettes remote from the filter.

In the shaking station the cigarettes emerging from a supply container or the like are shaken to such an extent that any loose tobacco crumbs or particles are removed. This shaking is naturally carried out only in a gentle manner so as not to damage the contents of the cigarettes. At the ends of the cigarettes, completely free small crumbs or tobacco particles emerge and drop off during shaking.

This tobacco which falls from the cigarettes is immediately drawn off by a suction device and can be used in the preparation process for the production of tobacco for the filling of the cigarettes so that with the device in accordance with the invention substantial savings in tobacco are brought about.

The steam-applying station has the purpose of bringing about a renewed moistening of the cigarettes at these ends at which tobacco is exposed so that any finely divided and possibly dry tobacco is caused to adhere to the rest of the tobacco in the cigarette.

This steam-applying station can be also followed by a further shaking station which ensures that no further free crumb material will be introduced into the package.

The conveyor preferably comprises two spaced rails or wires so that the cigarettes are only supported at two points and are otherwise exposed and can be readily subjected to the shaking operation so that crumb material which is freed falls downwardly into a suitable draw off dish.

The rails are preferably made up in sections in the longitudinal direction, of which at least one is connected with the shaking means.

It is also possible, however, for the conveyor to be made of two parallel wires which are engaged at certain sections by shaking means.

The shaking can be carried out with the help of a mechanical shaker, for example in the form of an eccentric which engages the corresponding rails or wire sections and causes them to perform shaking or swinging movements. It is, however, possible, especially in these cases in which the conveyor consists of wires, to employ electromagnetic shaking devices, and in this case suitable magnets are placed underneath the wires and the magnets are supplied with an alternating current so that the corresponding sections of wire are caused to vibrate as desired.

The steam applying nozzle can be coupled with a counting mechanism so that the number of cigarettes passing the counting nozzle can be determined as the cigarettes pass one by one past the nozzle.

The counting mechanism and the feed of the packing device can be coupled and controlled in accordance with the desired size of packing. It is possible to provide the conveying means with a preferably adjustable pre-sorter which divides the cigarettes, arriving in an uninterrupted succession, into the desired number of groups for packing and the groups pass into the means which entrains the suitably prepared foil web. This pre-sorter can comprise a chain on each side of the conveying means with projecting pins of which each takes a cigarette between them, while a pin corresponding to the number of the cigarettes to be packed in a package controls via a control device, for example a photocell, either the feed of the packing device or the chain for dividing up a desired number of cigarettes.

Such shaking, separating and steam applying devices can also, however, be provided at the lower end of the cigarette hopper directly and/or above the filling roller.

The invention finally relates to a package advantageously to be produced in accordance with the method of the invention and at least one embodiment of the apparatus in accordance with the invention. The various forms of embodiment possible in such a package will be described in conjunction with the particular description in more detail, since such a description can be made shorter and simpler in this manner.

Brief Description of the Drawings

FIG. 4 shows a package, produced by the apparatus shown in FIG. 1, ready for folding.

FIG. 5 shows the package during the course of folding.

FIG. 6 shows the package after folding together and practically finished apart from the application of the band.

FIG. 7 is a longitudinal section for the package in accordance with FIG. 6.

FIG. 13 is an embodiment of a package in the spread out condition, in accordance with the invention.

FIG. 14 is a view of the package in accordance with FIG. 13 after folding up.

FIG. 15 is a side view of the package in accordance with FIG. 14.

FIG. 16 shows a twin package representing two packages in accordance with FIGS. 13 to 15.

FIG. 17 shows a modified embodiment of a package in accordance with the invention.

Detailed Description

Figure 1:
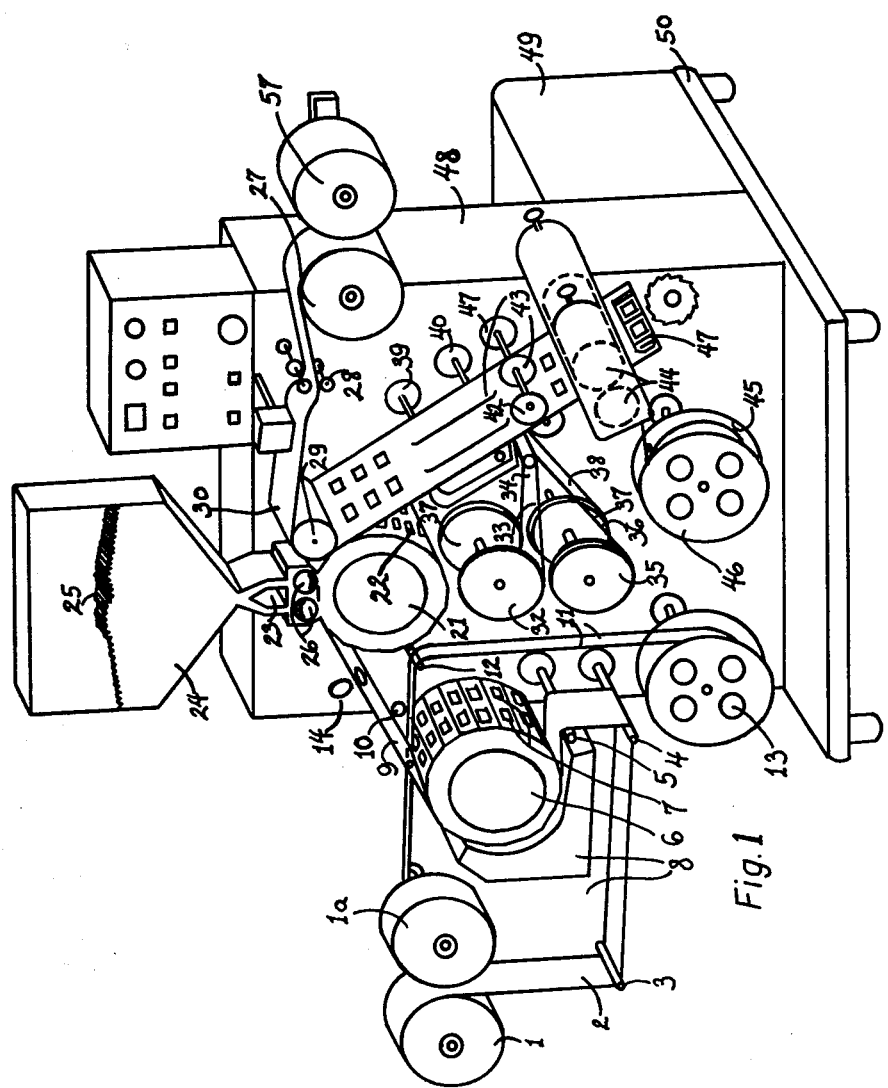
FIG. 1 is a diagrammatic perspective view of a device for carrying out the method in accordance with the invention.

In the case of the preferred embodiment shown in FIG. 1 foil runs from a supply roll 1 over guide devices 3, 4 and 5 onto a drum 6. Adjacent to the supply roll 1 there is a further supply roll 1a for use as soon as the roll 1 is exhausted. As is indicated by reference numeral 7, the drum 6 is provided with depression or recesses which are connected with a duct (not shown) inside the drum for applying suction. The depressions or recesses are in the form of adjacent troughs or grooves adapted to receive the cigarettes individually.

Around the part of the periphery of the drum 6 is a device 8 which serves for heating the drum and the foil 2 wrapped round it so that putting the duct in the drum 6 under vacuum draws the foil, heated by the heating device 8, into the recesses so that troughs are formed in the foil as indicated by reference numeral 9.

Reference numeral 10 indicates a trimming wheel for trimming the edges of the foil. As indicated by reference numeral 11, the served edge portions run over a guide element 12 onto a take-up roller 13.

Figure 3:
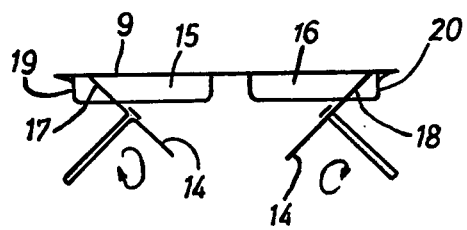
FIG. 3 shows the means for producing slots, diagrammatically.

The trimming knife 14 serves for cutting the grooves embossed in the foil obliquely, as shown in FIG. 3. This cut is important for the eventual cap of the package. FIG. 3 shows the foil in which the troughs 15, 16 are found and which are cut with the help of the trimming knives 14 at 17 and 18 obliquely so that caps 19 and 20 are produced.

The foil, which at this position in the apparatus is denoted by reference numeral 9, after this treatment now passes over the filling drum 21 which, as indicated by reference numeral 22 has depressions or recesses corresponding to the cigarette receiving grooves or troughs. In these troughs cigarettes are now placed which are supplied from the distributing device 23 from the mass 24 of cigarettes as indicated diagrammatically at 25. With the help of the two rollers 26 the cigarettes are placed one by one in the grooves or troughs.

The covering foil is supplied from a supply roll 27 and runs over edge trimming devices 28 and a roller 29 in the direction of the filling drum 21. The foil 30 comes to lie on the filled grooved foil and preferably is welded by a welding device, not shown in detail, with the grooved foil at the point at which the roller 29 cooperates with the filling drum 21. From the rolls 31 and 32 opening threads 33 and 34 are supplied which together with the covering foils 37 and 38 supplied from the rolls 35 and 36 are laid over the slots 17 and 18 (FIG. 3) so that the package is now closed on all sides and each individual groove or trough contains a cigarette locked in it.

Reference numerals 39, 40 and 41 denote drive wheels for the cutting and folding devices, for example the folding wheels 42 and 43. After suitable folds have been made, the foil with the cigarettes in it passes through a separating device 44, in which the lateral trimming operations are undertaken so that waste 45 is produced which is wound onto the winding up device 46.

The whole apparatus is connected with a power drive 48 with a drive unit 49 and a base 50 with feet. Reference numeral 51 denotes a reserve supply roll for the covering foil.

On the drum 6 it is naturally possible not only to provide the receiving troughs for the cigarettes or ether articles, but other deep drawn parts, for example for the insertion of a coin as change, a small package of matches or the like. Suitable devices for insertion of such articles are located at a position adjacent to the filling device above the drum 21.

The mass 24 of cigarettes can be caused to shake slightly in order to ensure a proper flowing movement of the cigarettes. Such means for producing shaking movements are known as such and are therefore not shown in detail in the drawing.

Figure 2:
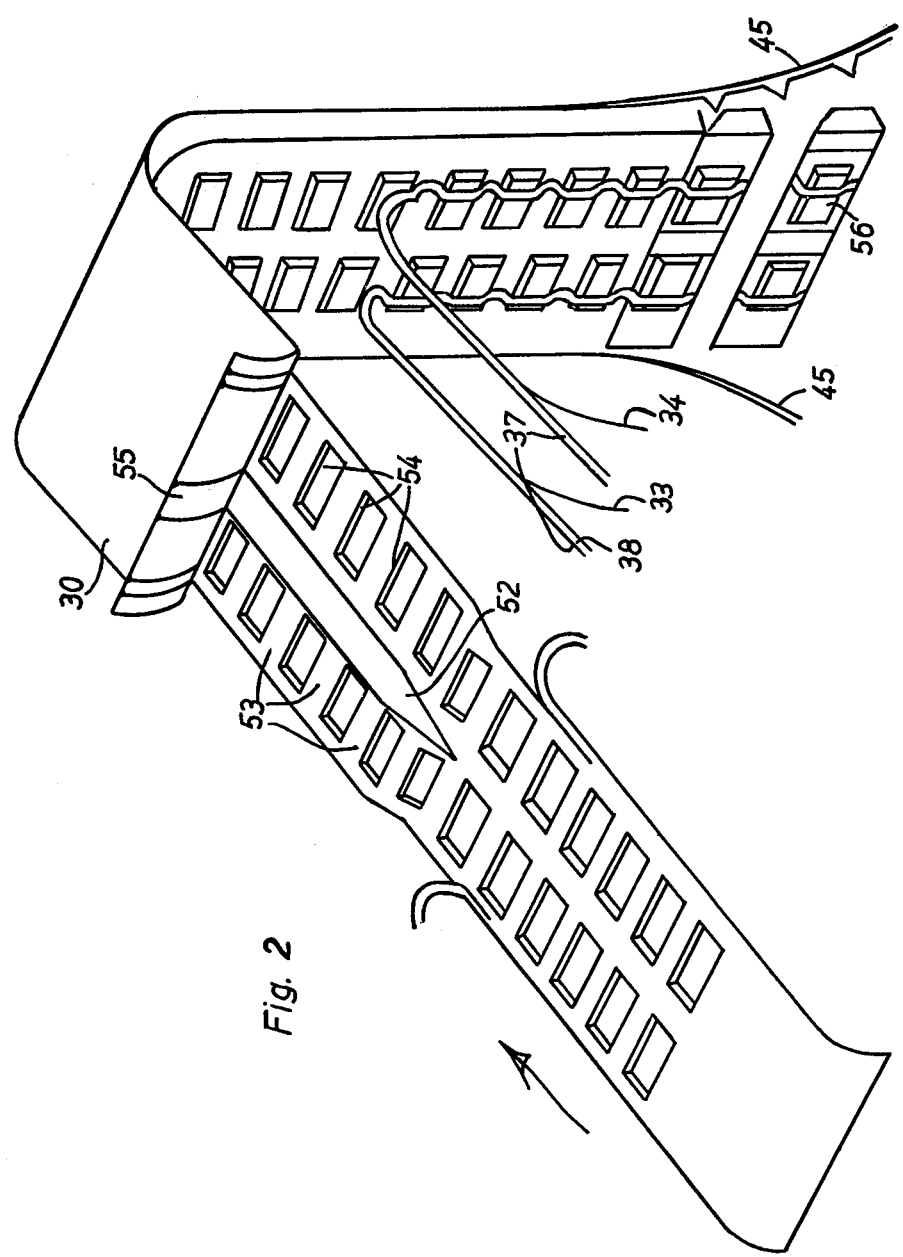
FIG. 2 is a view of a production stage which takes place downstream from the filling roller.

FIG. 2 shows the covering foil 30 and the grooved foil 9. It can be seen that on its movement towards the covering foil the grooved foil is cut centrally, as is denoted by reference numeral 52. The individual grooves 53 and 54 can be so separated that a part 55 remains on the covering foil 30 which is not covered with the material of the grooved foil, this simplifying the production of the package.

FIG. 2 also shows the application of the opening strips and the covering strips which cover them. At the end of the working operation package parts are produced which are indicated by reference numeral 56 in FIGS. 2 and 4. In these figures the foil package parts 53 and 54 are shown on the covering foil 30, together with the individual folding lines 57 to 59 which make it possible to produce a finished package from this structure. The finished package is shown in FIG. 6. From FIG. 5 it can be seen how the cap part 19 of the troughs 15 can be tipped backwards after the opening strip has been removed to tear open the package for taking its contents out.

FIG. 6 also shows the band 60 which is stuck on the package at the end of manufacturing operations.

FIG. 7 shows a section through the package with the troughs 15 and 16, the oblique cuts 17 and 18 and the remaining parts of the package, as described with reference to FIGS. 4 to 6.

Figure 8:
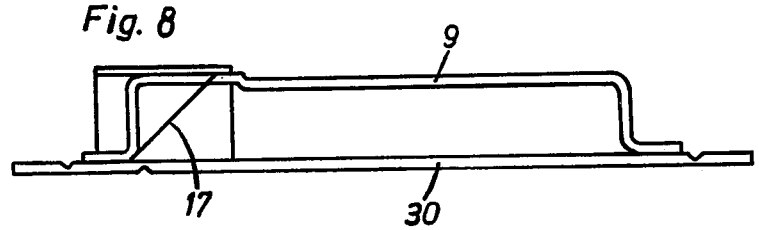
FIG. 8 is a section through a part of the package.
Figure 9:
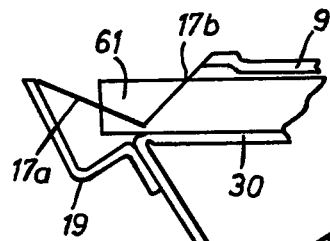
FIG. 9 is a section similar to that of FIG. 8 showing the package in the opened condition.

FIGS. 8 and 9 show in detail the opening of the package for exposing its contents, for example the cigarettes. The covering foil is denoted by reference numeral 30. The grooved foil is denoted at 9. The oblique cut is indicated by reference numeral 17 in FIG. 8 while reference numerals 17a and 17b show the bordering edges of this oblique cut in FIG. 9. Also some folding lines are shown in these figures, more particularly FIG. 9, so as to allow the cap 19 to be opened and thus allow access to the cigarettes 61.

It is naturally possible not only to produce twin packages as described above, with this apparatus, but also single packages, in which case the covering foil 30 is divided in a manner similar to the grooved foil 9. FIG. 2 shows the severing of the grooved foil. A person skilled in the art can easily carry out severing of the covering foil.

It is significant that on changing the format of the packages, that is to say for example on changing from packages containing six cigarettes to ones containing eight cigarettes it is only necessary to change the drum and the filling roller, while all other parts can be adjusted without difficulty. This takes substantially less time than is the case with conventional packaging machines, which do not operate on this rotating system.

It is naturally possible to use a photoelectric centering means for adjusting the position of the covering foil in the apparatus in accordance with the invention, so that it is possible to use printed covering foils which can be made to register to the millimeter and neatly produced packages always result. The expression "welding" used as regards the connection together of the covering foil and the gooved foil should not be understood in a limited sense. It is naturally also possible to attach the two foils together by adhesive or in accordance with other methods, for example by suitable embossing.

Figure 10:
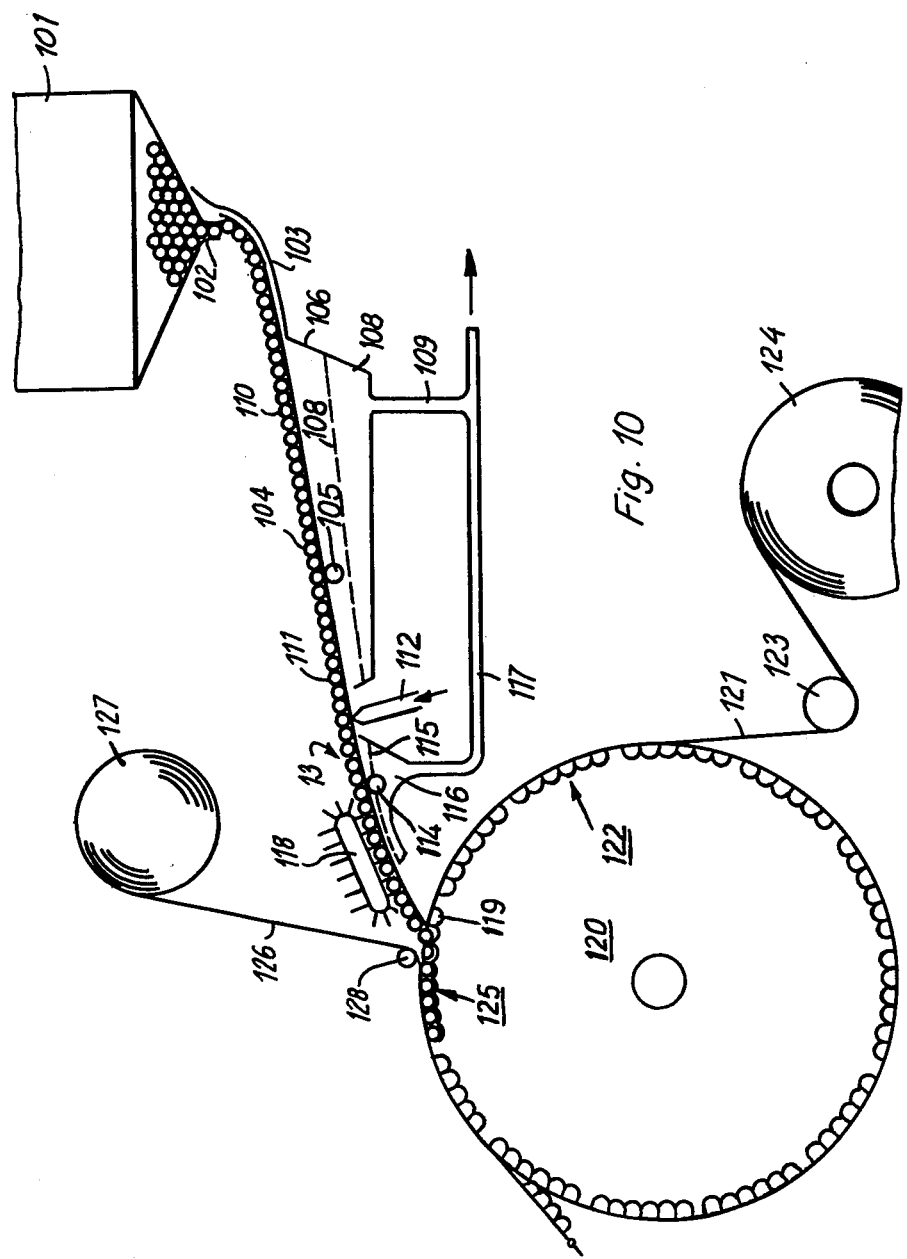
FIG. 10 shows a modified embodiment of the means for supplying cigarettes to the filling roller.

In FIG. 10 reference numeral 101 denotes an oblique-bottomed cigarette container with cigarettes placed in it. The container is mounted on a suitable part of the apparatus and discharges from its lower funnel-shaped end 102 the cigarettes one by one onto a conveyor belt 103. At 104 this conveyor belt 103 has a section which is acted upon by means of a shaking device 105. Underneath the conveyor belt there is a dish structure 106 which comprises for example a sieve element 107. Below the sieve element there is a vessel part 108 which is connected via a duct 109 with a suction or vacuum pump. The cigarettes moving on the conveyor belt 103-104 are therefore shaken at a position adjacent to the shaking device 105 and tobacco particles loosely attached to their ends are shaken off, fall through the sieve element 107, into the part 108 and pass to the suction or vacuum.

The conveyor belt part 104 is adjoined by a conveyor belt part 111 on which steam is directed by nozzles 112 against the free ends of the cigarettes.

Preferably this part is adjoined by a further part 113, which is acted upon by a shaking device 114. In this case as well a sieve 115 and a funnel-shaped container 116 are provided. The container is connected via the duct 117 with the suction. Above this part there is a device 118 which ensures that the cigarettes drop with the desired spacing into the grooves 119 of the drum 120, which entrains the lower foil 121. This foil 121 has the grooves 122. The foil 121 comes from a supply roll 124 and is guided by a guide roller 123.

When the grooves had been filled with cigarettes, as indicated by reference numeral 125, the grooves are covered with the upper foil 126 which is supplied from a supply roller 127 and passes via a guide roller 128 onto the drum 120. The devices for welding the edges of the covering foil 126 with the grooved foil 121 and the transverse severing means are not shown in FIG. 10.

Figure 11:
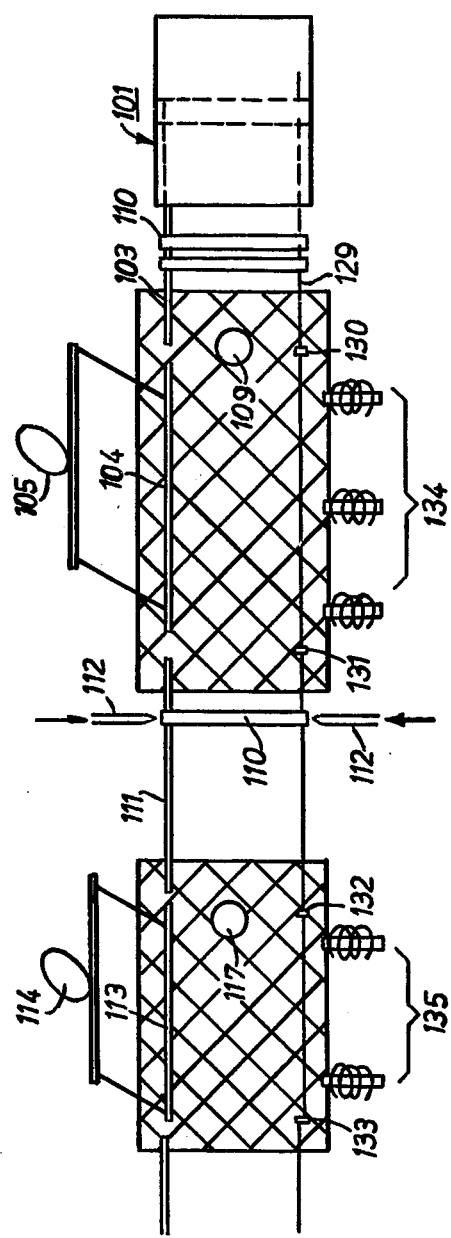
FIG. 11 is a plan view, more particularly of the conveying belt part.

FIG. 11 shows the path of movement of the foil diagrammatically to indicate two possible embodiments of the invention.

Reference numeral 101 again denotes the cigarette supply container, from which cigarettes 110 drop onto the conveyor belt and move along this path to the drum 120, which is not shown again in FIG. 11.

In the upper part of FIG. 11 rails and parts of rails 103, 104, 111, 113 are shown. The rail sections 104 and 113 are acted upon by the mechanical shaking devices 105 and 114.

The steam supply device is denoted by reference numeral 112 and comprises two steam nozzles which each direct steam onto the ends of the cigarettes 110. In the case of filter cigarettes it is possible to dispense with one of the steam applying nozzles 112.

In the lower part of FIG. 11 the conveying means is in the form of a continuous wire, which is attached at 130, 131, 132 and 133. Between these points of attachment there are suitable magnetic shaking devices 134 and 135 which can be of conventional design and are therefore not described in detail.

Figure 12:
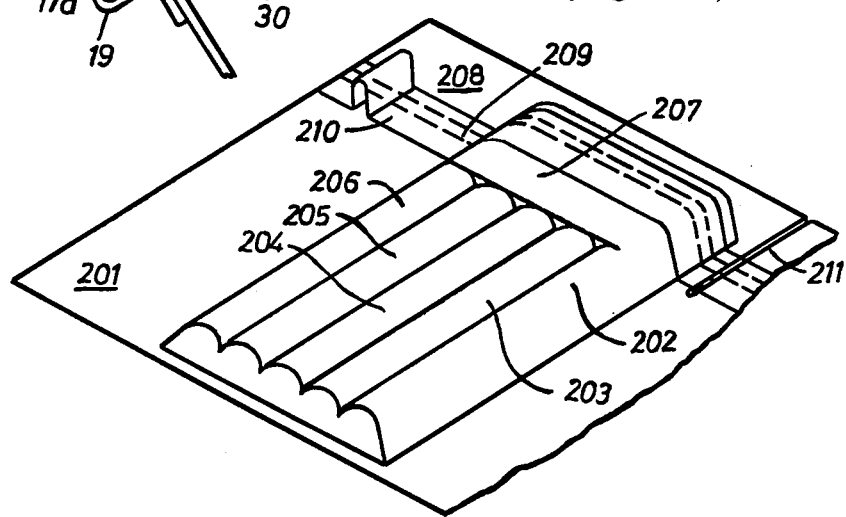
FIG. 12 is a view of a single package.

As shown in FIG. 12 the grooved foil 201 has grooves 202-206 each capable of receiving one cigarette. These grooves 202-206 merge with a pocket 207 which has the same depth as the grooves but is not divided up.

In the case of the embodiment shown in FIG. 12 the foil 201 is associated with the second foil 208 which overlaps it at 209. This arrangement of the second foil 208 can be provided for by slitting a foil which has the same breadth as the foil 201 and the foil 208, the foil parts 208 being moved in a direction perpendicular to the direction of travel as it moves to the embossing rollers. Alternatively a second foil with the breadth of the foil 28 can be provided and this foil is caused to run in with the breadth of the foil 209 so that the desired overlapping is attained at 209.

The overlapping and separation position at 209 is covered by a web of foil 210, which can simultaneously contain the opening band. It is naturally also possible to operate in such a manner that the foil web 210 is only applied later. Reference numeral 211 indicates a cut which makes it possible on tearing open with the opening band to open only one of the packages with the cigarettes accommodated in the grooves 202 to 206.

FIGS. 13 to 17 show various packages which can be produced with the package shown in FIGS. 4 to 6 in accordance with the invention. In a lower foil in the case of the package in accordance with FIGS. 13 to 15 suitable grooves are provided in which the cigarettes 301 are mounted. The lower foil is covered by a covering foil which is not shown in detail in the drawings but ensures that the cigarettes 301 remain in their grooves. Besides the grooves 301 the foils are also provided at the position 302 to 306 with transverse folds so that the whole structure in accordance with FIG. 13 can be folded together. The cigarettes are now in the interior and the outer foil can be covered with the covering web so that the package reasembles a conventional cigarette package. Reference numeral 307 denotes a cross piece with a tax mark 308 stuck on it.

The embodiment of the invention shown in FIG. 16 differs from those of FIGS. 13 to 15 only in that several such layers are arranged one above the other, the tax mark 308 being arranged over the edge of the package.

The construction in accordance with FIG. 17 differs from that in accordance with FIGS. 13 to 16 in that between each groove a continuous fold is provided so that the package can be folded together to form a cylindrical body which has piece 307 over which the tax mark or a band 308 is stuck.

I claim:

1. A cigarette package (FIG. 6 formed from foldable elements comprising:
   (a) a first foil web (9) having a substantially rectangular shape with a trapezoidal section at one end thereof (FIG. 4);
   (b) said first foil web (9) having a first group of troughs formed therein distal said trapezoidal section;
   (c) a second group of troughs formed in said first foil web (9) between said trapezoidal section and said first group of troughs;
   (d) each said trough containing only one cigarette (61) therein;

(e) said troughs and cigarettes (61) having their major longitudinal axes disposed parallel to the major longitudinal axis of said substantially rectangular shape of said first foil web (9);

(f) a second foil web (30) covering said troughs and cigarettes (61) and being welded to said first foil web (9) to form individual sealed compartments each containing therein its own single cigarette (61);

(g) a first cut (17) across said first group of troughs in the end thereof distal said trapezoidal section;

(h) a second cut (18) across said second group of troughs in the end thereof proximal said trapezoidal section;

(i) said first and second cuts (17, 18) being oblique to their associated troughs;

(j) a first opening thread (33) laid over said first cut (17);

(k) a second opening thread (34) laid over said second cut (18);

(l) a first covering foil strip (38) affixed over said first opening thread (33) and said first cut (17) closing said compartments of said first group of troughs;

(m) a second covering foil strip (37) affixed over said second opening thread (34) and said second cut (18) closing said compartments of said second group of troughs;

(n) each said closed compartment being air-tight to seal the cigarette therein in its own separate predetermined atmosphere until opened by its associated opening thread (33 or 34);

(o) two transverse fold lines (57) disposed between said first and second groups of troughs;

(p) a transverse fold line (58) disposed adjacent said end of said first group of troughs;

(g) two transverse fold lines (59) disposed between said trapezoidal section and said second group of troughs;

(r) the above mentioned elements being foldable about said fold lines (57,58,59) to form said package (FIG. 6) wherein said first and second groups of troughs overlie and contact each other in only a single common tangential straight plane intermediate said first and second groups of troughs; and (s) a band (60) affixing said trapezoidal section to the exposed surface of said second foil web (30) to seal said package.

2. A package in accordance with claim 1 wherein said second web has a layer of paper laminated on it.

3. A package according to claim 1 wherein:
said troughs conform to the shape of the cigarette; and a planar surface of foil is provided between the groups having a width greater than twice the thickness of a cigarette.

4. A cigarette package (FIG. 15) formed from foldable elements comprising:
(a) a first foil web having a substantially rectangular shape with a trapezoidal section (307) at one end thereof (FIG. 13);
(b) said first foil web having a first group of troughs (60) formed therein distal said trapezoidal section;
(c) a second group of troughs formed in said first foil web between said trapezoidal section (307) and said first group of troughs;
(d) each said trough containing only one cigarette (301) therein;
(e) said troughs and cigarettes (301) having their major longitudinal axes disposed perpendicular to the major longitudinal axis of said substantially rectangular shape of said first foil web;

(f) a second foil web covering said troughs and cigarettes (301) and being welded to said first foil web to form individual sealed compartments each containing therein its own single cigarette (301);

(g) a first cut (17) across said first group of troughs;

(h) a second cut (18) across said second group of troughs;

(i) said first and second cuts (17, 18) being oblique to their associated troughs;

(j) a first opening thread (33) laid over said first cut (17);

(k) a second opening thread (34) laid over said second cut (18);

(l) a first covering foil strip (38) affixed over said first opening thread (33) and said first cut (17) closing said compartments of said first group of troughs;

(m) a second covering foil strip (37) affixed over said second opening thread (34) and said second cut (18) closing said compartments of said second group of troughs;

(n) each said closed compartment being air-tight to seal the cigarette therein in its own separate predetermined atmosphere until opened by its associated opening thread (33 or 34);

(o) two transverse fold lines (304,305) disposed between said first and second groups of troughs;

(p) a transverse fold line (306) disposed adjacent the end of said first group of troughs distal said trapezoidal section (307);

(q) two transverse fold lines (302,303) disposed between said trapezoidal section and said second group of troughs;

(r) the abovementioned elements being foldable about said fold lines (302-306) to form said package (FIG. 15) wherein said first and second groups of troughs overlie and contact each other in only a single common tangential straight plane intermediate said first and second groups of troughs; and (s) a band (308) affixing said trapezoidal section (307) to the exposed surface of said second foil web to seal said package.

5. A package in accordance with claim 4 wherein said second web has a layer of paper laminated on it.

6. A package according to claim 4, wherein:
said troughs conform to the shape of the cigarettes; and a planar surface of foil is provided between the groups having a width greated than twice the thickness of a cigarette.

7. A cigarette package (FIG. 17) formed from foldable elements comprising:
(a) a first foil web having a substantially rectangular shape with an end piece (307) at one end thereof;
(b) said first foil web having a group of troughs formed therein;
(c) each said trough containing only one cigarette (301) therein;
(d) said troughs and cigarettes (301) having their major longitudinal axes disposed perpendicular to the major longitudinal axis of said substantially rectangular shape of said first foil web;
(e) a second foil web covering said troughs and cigarettes (301) and being welded to said first foil web to form individual sealed compartments each containing therein its own single cigarette (301);
(f) a first cut (17) across said group of troughs;
(g) said first cut (17) being oblique to said troughs;

(h) a first opening thread (33) laid over said first cut (17);

(i) a first covering foil strip (38) affixed over said first opening thread (33) and said first cut (17) closing said compartments of said group of troughs;

(j) each said closed compartment being air-tight to seal the cigarette therein in its own separate predetermined atmosphere until opened by said opening thread (33);

(k) transverse fold lines arranged so that between adjacent troughs one said fold line is disposed;

(l) the abovementioned elements being foldable about said fold lines to form a cylindrical package (FIG. 17) wherein said sealed compartments are equidistant from a central longitudinal axis of said cylindrical package, and each sealed compartment is disposed between and contiguous with two other such sealed compartments; and (m) a band (308) affixing said end piece (307) to the exposed surface of said second foil web to seal said cylindrical package.

8. A package in accordance with claim 7 wherein said second web has a layer of paper laminated on it.

9. A cigarette package (FIG. 12) formed from foldable elements comprising:

(a) a first foil web (201) having a substantially rectangular shape with a trapezoidal section (307) at one end thereof;

(b) said first foil web having a first group of troughs formed therein distal said trapezoidal section;

(c) a second group of troughs formed in said first foil web between said trapezoidal section and said first group of troughs; p1 (d) each said trough containing only one cigarette (301) therein;

(e) said troughs and cigarettes having their major longitudinal axes disposed perpendicular to the major longitudinal axis of said substantially rectangular shape of said first foil web;

(f) a second foil web covering said troughs and cigarettes and being welded to said first foil web to form individual sealed compartments each containing therein its own single cigarette;

(g) each said closed compartment being air-tight to seal the cigarette therein in its own separate predetermined atmosphere until opened;

(h) two transverse fold lines (304, 305) disposed between said first and second groups of troughs;

(i) a transverse fold line (306) disposed adjacent the end of said first group of troughs distal said trapezoidal section;

(j) two transverse fold lines (302, 303) disposed between said trapezoidal section and said second group of troughs;

(k) each said group having a flat pocket (207) merging with the troughs in that particular group;

(l) said pocket having the same depth as said troughs;

(m) a counter foil (208) overlapping said webs at a separation position (209);

(n) a cut (211) in said webs and foil between said first and second groups;

(o) a web of foil (210), containing an opening band, covering said separation position in said groups and extending the major part of the length of said webs;

(p) said cut permitting the opening of one said group while leaving the other said group unopened;

(q) the abovementioned elements being foldable about said fold lines to form said package wherein said first and second groups of troughs overlie and contact each other in only a single common tangential straight plane intermediate said first and second groups of troughs; and (r) a band (308) affixing said trapezoidal section to the exposed surface of said second foil web to seal said package.

10. A package in accordance with claim 9 wherein said second web has a layer of paper laminated on it.

* * * * *